United States Patent [19]
Lewis

[11] Patent Number: 5,419,739
[45] Date of Patent: May 30, 1995

[54] FLAP-TYPE PRESSURE RELIEF VALVE AND METHOD OF FORMING THE SAME

[75] Inventor: Jeffrey C. Lewis, Rochester Hills, Mich.

[73] Assignee: TRW Inc., Cleveland, Ohio

[21] Appl. No.: 128,544

[22] Filed: Sep. 28, 1993

[51] Int. Cl.⁶ .............................................. B60H 1/26
[52] U.S. Cl. ................................... 454/162; 454/164; 137/855; 137/856
[58] Field of Search ........................ 454/162, 164, 165; 137/855, 856, 846

[56] References Cited

U.S. PATENT DOCUMENTS

| | | | |
|---|---|---|---|
| 4,667,578 | 5/1987 | Hagenah | 454/162 |
| 4,781,106 | 11/1988 | Frien | 454/164 |
| 4,972,765 | 11/1990 | Dixon | 137/855 |
| 5,167,574 | 12/1992 | Ikeda et al. | 454/164 |
| 5,194,038 | 3/1993 | Klomhaus et al. | 137/855 |
| 5,253,617 | 10/1993 | Fitzpatrick et al. | 137/856 |

Primary Examiner—Henry C. Yuen
Attorney, Agent, or Firm—Daniel G. Blackhurst

[57] ABSTRACT

A flap type pressure relief valve comprises a frame having an opening therethrough controlled by a valve flap in the form of a flexible sheet of material mounted to the frame along a first side of the opening to overlie the opening. The flexible sheet is joined to the frame by a connection comprising slots through the frame adapted to receive and retain tabs on the valve flap that extend through the apertures. The tabs are formed of resilient and compressible elastomeric material and have enlarged first and second retaining ribs extending closely adjacent the respective slot on both side faces of the frame with a necked connecting portion disposed between the first and second ribs. The connecting portion of each tab is seated within the respective aperture and is under compression and completely fills the aperture and compressively engages the frame. The retaining ribs hold the valve flap in its assembled location.

16 Claims, 3 Drawing Sheets

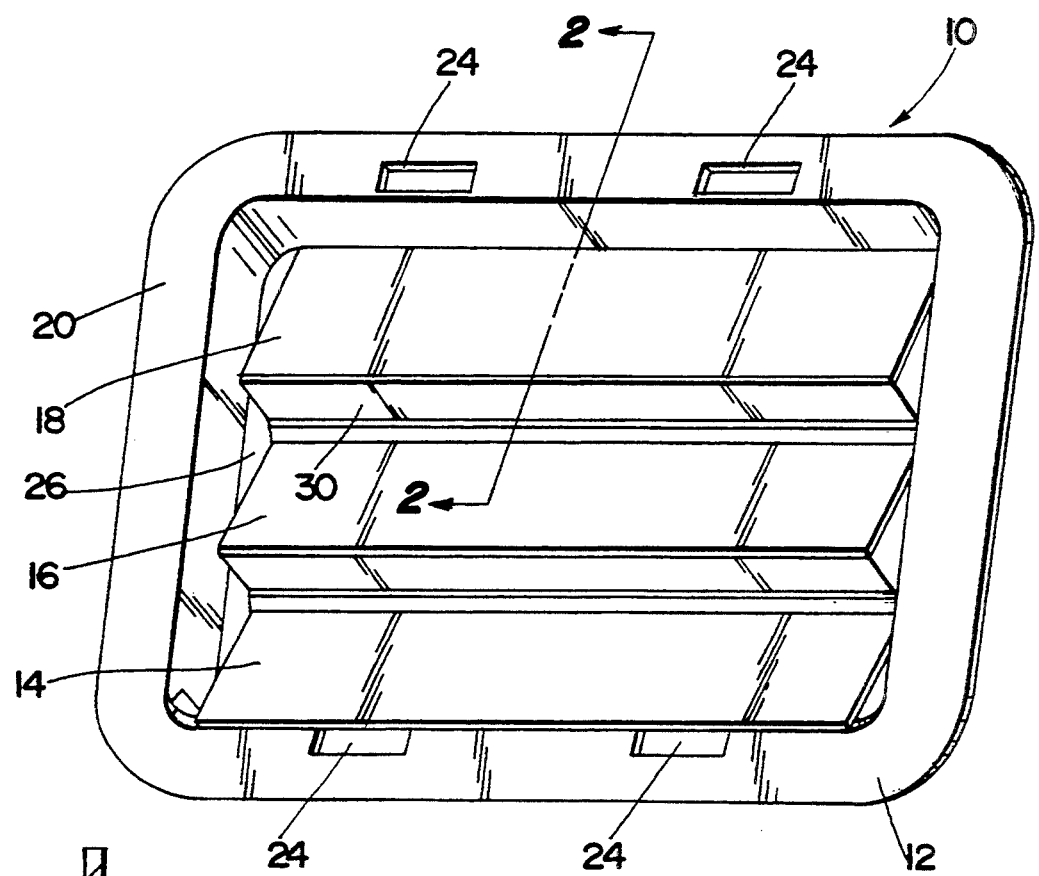
Fig.1
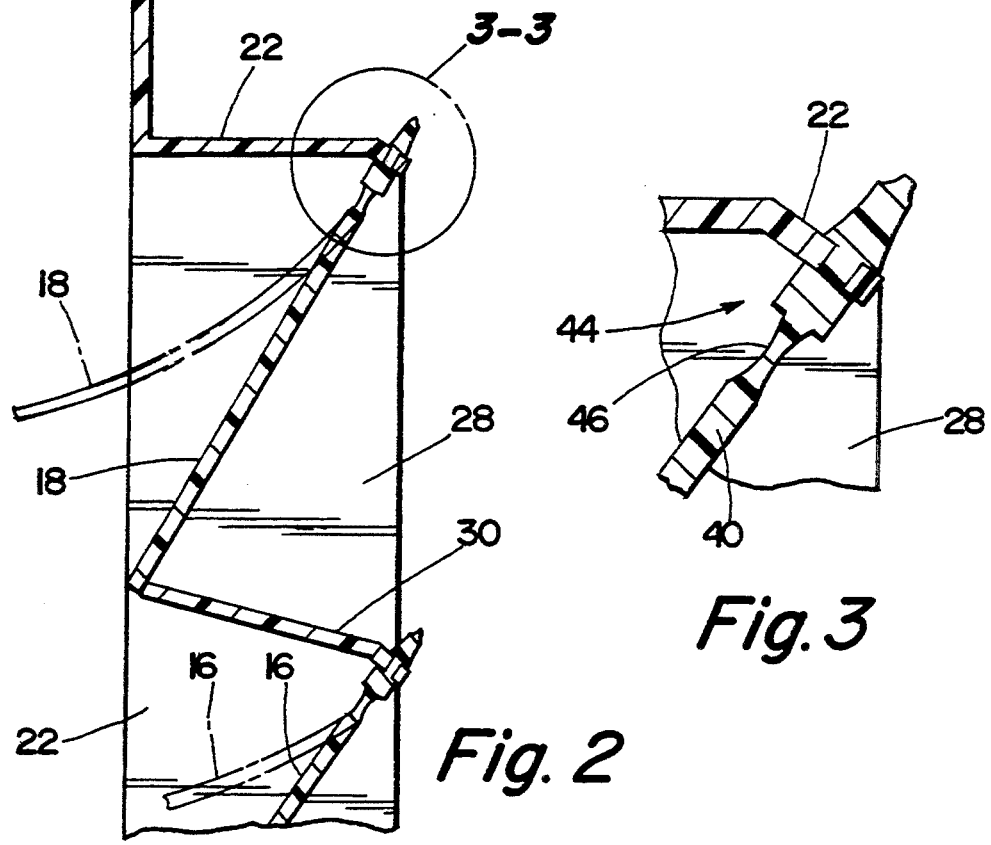
Fig.2
Fig.3

FLAP-TYPE PRESSURE RELIEF VALVE AND METHOD OF FORMING THE SAME

BACKGROUND OF THE INVENTION

The subject invention is directed toward the art of air vents for vehicles and, more particularly, to a flap-type check or pressure relief valve for controlling the flow of air into and out of a vehicle.

Flap-type check valves are widely used in the motor vehicle art to relieve air pressure surges or peaks in the passenger compartment which result, for example, when the doors are slammed shut. The valves generally comprise a simple rigid frame or housing which mounts in a vehicle body panel opening and provides one or more air outlets. A valve element in the form of a flexible sheet is joined along one edge to the frame to overlie the outlets on the side exterior to the vehicle compartment.

The valve element sheets have been connected to the frame using a variety of techniques, including separate mechanical fasteners, heat welding processes, and molded tabs. See, for example, U.S. Pat. Nos. 4,972,765 and 4,667,578 which disclose the various prior art connecting techniques.

Each of the prior techniques have one or more disadvantages, such as general complexity, air leakage, multiple components, and/or labor intensive assembly. Consequently, there exists a need for a simpler and more effective design for such air relief valves.

SUMMARY OF THE INVENTION

The subject invention provides a flap-type valve and frame assembly which greatly simplifies and improves the relationship between the flap valve elements and their supporting frame. Through the use of the invention, the connection between the frame and the flap valve is a sealed, airtight connection and assembly is greatly facilitated.

In accordance with one aspect, a pressure relief valve having a frame with an opening therethrough and a valve element in the form of a flexible sheet of material mounted to the frame to overlie the opening is provided with improved connecting means for mounting the flexible sheet to the frame. The connecting means comprises at least one aperture through the frame along a first side of the opening and a tab element on a first edge of the sheet extending through the aperture. The tab element is formed of resilient and compressible elastic material and has enlarged first and second portions extending outwardly about the aperture on both side faces of the frame with a connecting portion between the first and second portions. The connecting portion is located within the aperture and is sized so that it is under compression by the frame and completely fills the aperture. Preferably, the tab element is molded integrally with the flexible sheet.

In accordance with a somewhat more limited aspect, the connecting portion located within the aperture is compressed by the frame and is under tension between the first and second portions so as to cause the first and second portions to compress against the opposite side faces of the frame.

In accordance with a further aspect of the invention, the tab element has an outer free end which is smaller than the aperture and the tab gradually increases in size from the outer free end to the first enlarged portion.

In accordance with yet a further aspect, there are preferably a plurality of the tab elements located along the first edge of the sheet and individually received in separate apertures extending through the frame along the first side edge of the opening. In addition, the tab element is preferably joined to the flexible sheet through a thin and flexible hinge portion.

By the use of tab portions that are sized and related to the frame apertures as described, the tab totally seals the aperture. By proper design of the tab portion, installation and connection of the flexible sheet which forms the valve element is greatly facilitated and the connector can be an integral part of the sheet or valve element. Thus, the entire assembly can consist solely of the flap valve and the frame. Both of the elements can be formed using well known plastic molding techniques.

In accordance with a still further aspect of the invention, there is provided a method of forming a flap-type pressure relief valve which comprises providing a relatively rigid frame defining a flow passage with an outlet opening having a first wall extending along a first side of the opening. An aperture is provided through the first wall at a location adjacent the outlet opening. A valve element is provided in the form of a relatively thin sheet of material of a size sufficient to completely overlie the outlet opening. The sheet has a tab extending from an edge thereof with the tab being formed from a resilient elastomeric material and including a base joined to the sheet, a tab body terminating in an outer free end of a cross-section less than the aperture. The tab body includes an intermediate portion between the base and the free end that, in its relaxed state, is larger in cross-section than the aperture but which can be reduced to a cross-section less than the aperture by applying tension between the base and the free end. The sheet is positioned over the outlet opening with the tab aligned with the aperture and thereafter the free end of the tab is placed through the aperture and tension is applied to the tab portion to reduce the cross-section of the intermediate portion sufficiently to allow the intermediate portion to enter the aperture. Thereafter, the tension on the tab is released to allow the intermediate portion to expand into a compressed and engaged state with the walls of the aperture.

Preferably, the free end portion of the tab is removed after the intermediate portion is in the aperture.

In accordance with yet another aspect of the invention, the tab portion is removed by providing a thin frangible section in the free end portion with the frangible section designed such that it fractures when the force applied thereto slightly exceeds the force necessary to reduce the intermediate portion to a size such that it can be inserted into the aperture.

As can be seen from the foregoing, the primary object of the invention is the provision of a flap-type valve structure which has an improved connection arrangement between the flap valve and its supporting frame structure.

A still further object is the provision of the flap valve assembly of the general type described wherein the connecting means for the flap valve comprises an integral tab formed on the flap valve with the tab forming both the connecting means and the flap valve hinge element.

A still further object is the provision of a flap-type check valve of the general type described wherein the entire assembly comprises a main frame and the desired number of flap valve elements with all of the connectors being integrally formed on the flap valves.

BRIEF DESCRIPTION OF THE DRAWINGS

The above and other objects and advantages will become apparent from the following description when read in conjunction with the accompanying drawings wherein:

FIG. 1 is an isometric view of a preferred flap valve assembly formed in accordance with the subject invention;

FIG. 2 is a partial cross-sectional view taken on lines 2—2 of FIG. 1;

FIG. 3 is a greatly enlarged view of the circled area of FIG. 2;

DETAILED DESCRIPTION OF THE PREFERRED EMBODIMENT

Referring more particularly to the drawings wherein the showings are for the purpose of illustrating a preferred embodiment of the invention only, and not for the purpose of limiting same, FIGS. 1 through 4 best illustrate the overall arrangement of the preferred embodiment of a flap valve element formed in accordance with the subject invention. Generally, the flap valve assembly is identified with the numeral 10 and includes a generally vertically oriented, relatively rigid main frame 12 that carries three separate spaced valve flaps 14, 16, and 18. In the subject embodiment, the flaps are positioned in vertically spaced relationship. It should be readily understood, however, that the particular number and arrangement of the flaps relative to the frame is not of significance to the invention and other different arrangements could be used.

Figure 4:
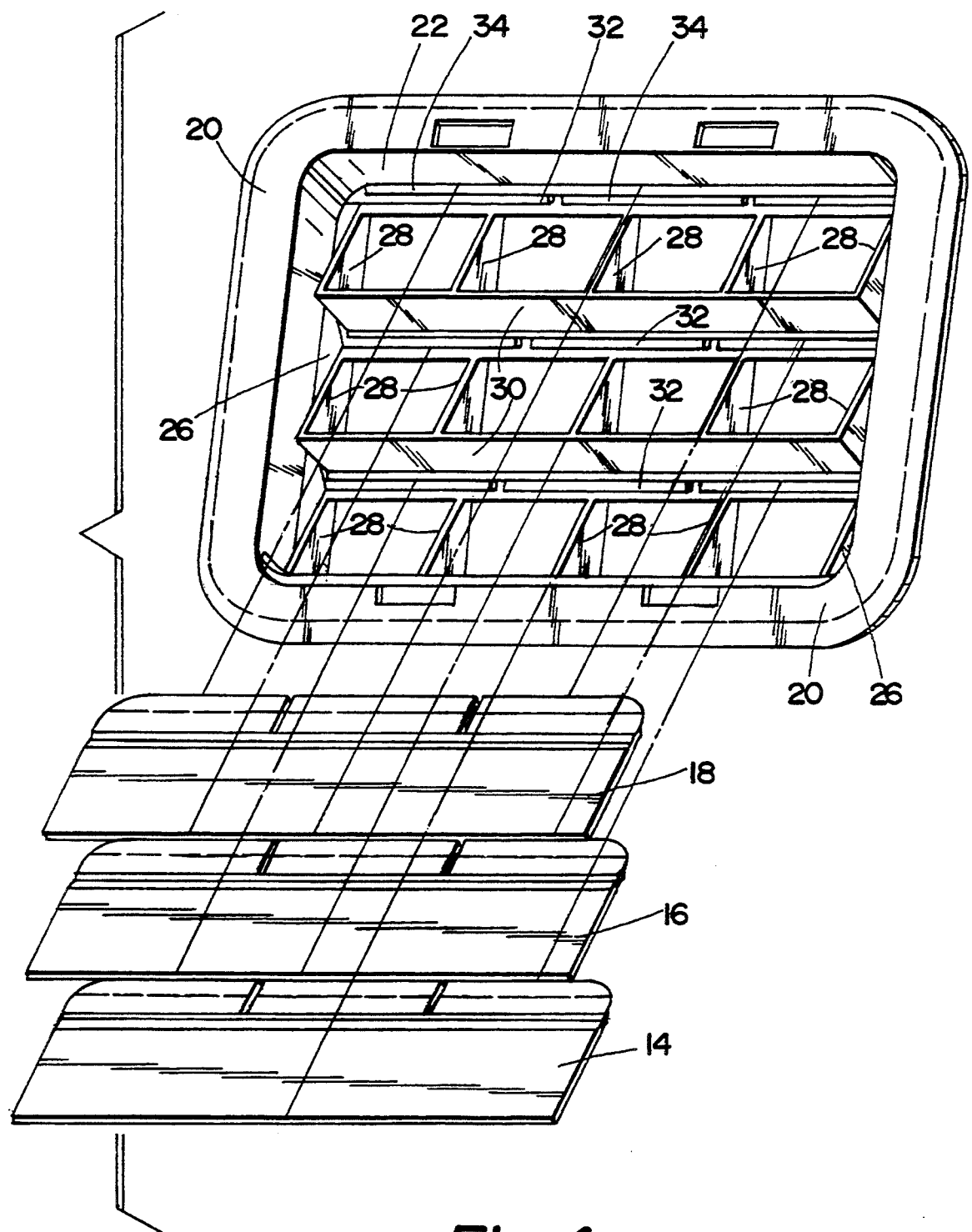
FIG. 4 is a view similar to FIG. 1 but showing the flap valve assembly prior to the time that the individual flap elements have been assembled to the frame assembly.

The frame 12 can best be understood by reference to FIGS. 1, 2, and 4. As shown therein, the frame 12 includes a main, circumferentially extending, rigid peripheral flange 20 that has a generally rectangular shape with suitably rounded corners and supports a second, axially extending, inner peripheral flange 22. Suitable mounting openings 24 are carried in the flange 20. The openings 24 provide means for joining the valve assembly to the associated vehicle support panels, walls, or the like.

As best illustrated in FIGS. 2 and 4, a somewhat grid-like structure is supported from the end of the flange 22 and comprises a pair of vertically extending end members shown as rails 26 and a plurality of partition walls 28 that are generally vertically oriented and cross-connected with inclined dividing panels or walls 30. The walls and panels define a grid structure as illustrated in FIG. 4 with three rows of aligned rectangular airflow outlet openings.

Located immediately above each horizontal row of the through openings defined by walls 28 and 30 are relatively narrow connecting strips 32 that extend horizontally between the rails 26. Each strip 32 is pierced by three collinear, horizontally extending narrow slots 34.

The slots 34 provide means for receiving and retaining the individually flaps 14, 16, and 18 in a manner subsequently to be described. For the present, however, it should be noted that the walls 28 and 30 are arranged so that the outlets of the through openings are on an incline such as can readily be seen in FIGS. 2 and 4. This inclined arrangement assures that the valve flaps will normally be closed under the influence of gravity in the manner shown in FIG. 1. However, when the air pressure on the right side of the valve assembly (as viewed in FIG. 2) rises slightly, the flaps 14, 16, and 18 will lift off their supporting framework and move to an open position such as shown in phantom in FIG. 2.

In the embodiment under consideration, the flaps 14, 16, and 18 are identical and the description of one flap and its connection to the frame 12 is to be taken as exemplary of the other two. It should, of course, be understood that the individual valve flaps could vary one from the other within the scope of the invention. However, in the subject preferred embodiment, each of the valve flaps 14, 16, and 18 is formed as a single, relatively thin flexible sheet of material such as illustrated in FIGS. 4 and 5 having a longitudinal extent as shown and being formed from a resilient, flexible elastomeric material or a suitable plastics material, such as polyethylene or polyvinyl chloride having the necessary resiliency and physical characteristics required.

Figure 5:
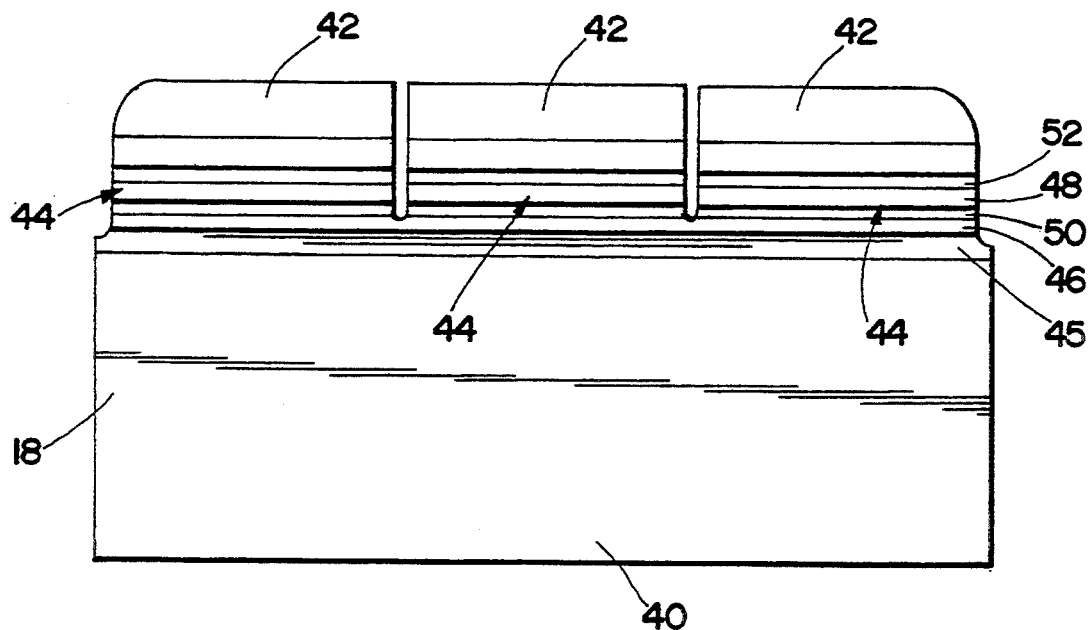
FIG. 5 is an enlarged plan view of a single flap valve element and its integral connecting portion as used in the FIG. 1 embodiment; and, FIGS. 6A through 6D show the sequence of steps used in installing the flap valve element into the frame assembly.

As best shown in FIG. 5, each of the valve flaps includes the relatively thin, flexible main valve sheet 40 and a plurality of co-planar tabs 42. In the subject embodiment, there are three tabs 42 each having a respective connecting portion 44. Preferably, the valve sheet 40 and the connecting tabs 42 are formed as an extrusion molding that has constant cross-section in planes perpendicular to the length of the flap. The final shape and form is best shown in FIGS. 3 and 6A through 6D. This form is achieved by cutting the extrusion molding to have the desired peripheral shape. As shown, the valve sheet 40 joins the individual tabs through a reduced thickness portion 45. The reduced thickness portion 45 extends the length of the main body and forms a living hinge so as to provide a substantial degree of flexibility between the main body and the connecting portions 44 of the tabs 42.

The connecting portion 44 is, as will become apparent, sized according to the size of the slots 34 so as to provide a tight sealed connection between the valve flaps and the supporting frame 12. In particular, the connecting portion 44 comprises a pair of relatively heavy, enlarged first and second retaining ribs 46 and 48 separated by an intermediate portion 50. The intermediate portion 50 has a cross-sectional shape including a length and thickness which is, in its relaxed state, greater than the length and width of the slot 34. The ribs 46 and 48 are, however, thicker than the width of the slot 34 by a relatively substantial amount. The retaining rib 48 is provided with a tapered cross-section which joins through a relatively narrow, reduced thickness portion 52 with an elongated, tapered tab end 54. The thickness of portion 48 preferably gradually increases until its juncture with the reduced intermediate section 50. The thickness of the tab end 54 at its outer free end, however, is preferably somewhat smaller than the width of the slot 34.

Figures 6A, 6B, 6C, 6D:
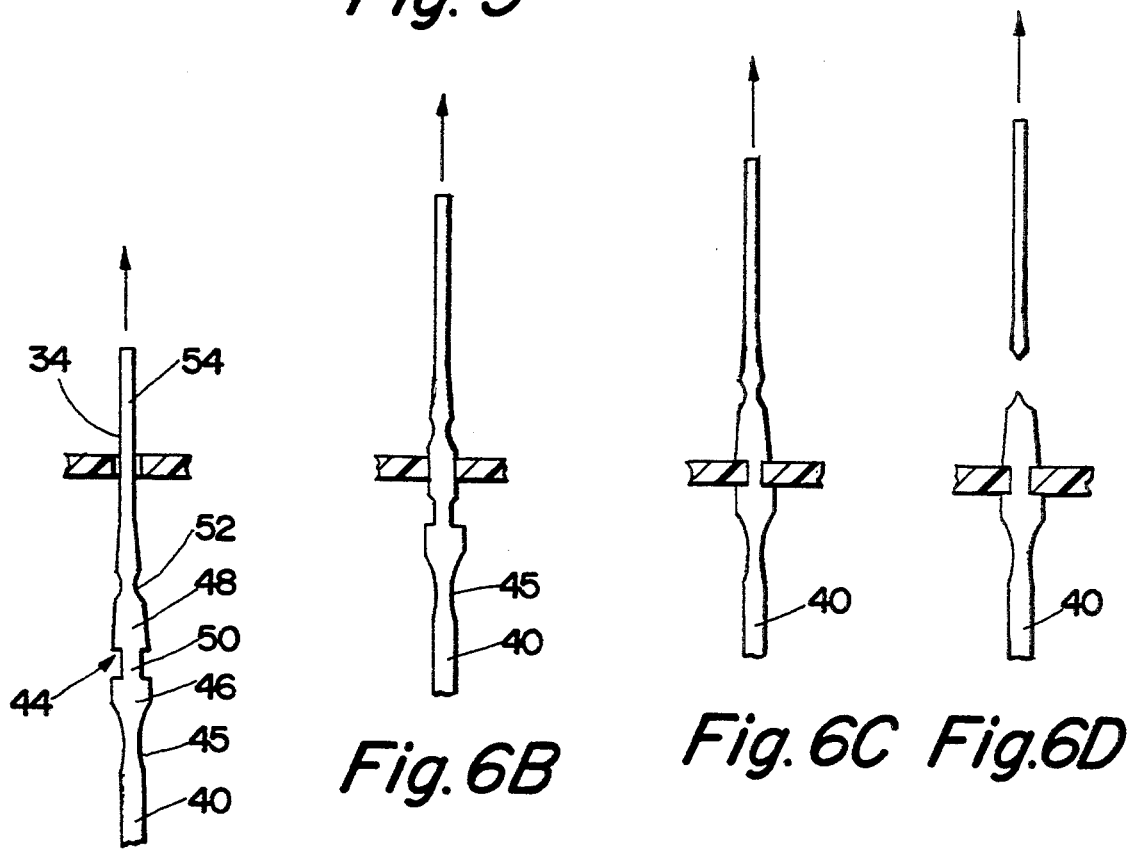

The described construction and arrangement together with the shape of the tabs 42 allows the individual valve flaps to be rapidly and efficiently assembled to the frame 12. This sequence of assembly steps is best seen in FIGS. 6A through 6D. As illustrated therein, the outer, reduced-size tab end 54 is inserted through the associated slot 34 and a pulling force is applied to the tab end 54 to pull the tab 42 into the slot. As shown in FIG. 6B, the longitudinal pulling and the taper of the retention rib 48 are such that the ribs 48 can be pulled through the slot 34 to seat the connecting portion 50 within the slot 34. This is possible because of the reduction in cross-sectional size which results from the longitudinal tension applied to the connecting portion and the end tab portion 54. When the tab 42 has been fully pulled to its desired finished position within the slot 34 as depicted by FIG. 6C, the somewhat larger first retention rib 46 engages the wall 32 and, because of its relatively large size and lateral extent, prevents further movement of the valve flap. Further pulling on the free end of tab 54 therefore results in separation of the tab end 54 from retention rib 48 at the reduced thickness portion 52. This reduce thickness portion 52 is sized and related to the connecting portions so as to assure that separation will take place without the section 46 being drawn into the opening 34.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a flap type pressure relief valve having a frame with opposite side faces including a flow opening therethrough and a valve element in the form of a flexible sheet of material having a first edge and mounted to the frame along a first side of the flow opening to overlie the flow opening, improved connecting means for mounting the flexible sheet to the frame comprising at least one connecting aperture through the frame along the first side of the flow opening and a tab element on the first edge of the sheet and extending through the connecting aperture, the tab element being formed of resilient and compressible elastomeric material and having enlarged first and second portions extending outwardly about the connecting aperture on both side faces of the frame with a connecting portion between the first and second portions, said connecting portion located within the connecting aperture, the connecting portion in the connecting aperture being under compression and completely filling the aperture and compressively engaging the frame.

2. The improved pressure relief valve as defined in claim 1 wherein the tab element is molded integrally to the flexible sheet.

3. The improved pressure relief valve as defined in claim 2 wherein the tab element and the flexible sheet are formed from the same material.

4. The improved pressure relief valve as defined in claim 1 wherein the tab element has an outer free end which is smaller than said connecting aperture, said tab element gradually increasing in size from the outer free end to the first enlarged portion.

5. The improved pressure relief valve as defined in claim 1 wherein the tab element is joined to the flexible sheet through a thin and flexible hinge portion.

6. The improved pressure relief valve as defined in claim 5 wherein there are a plurality of the tab elements along the first edge of the sheet.

7. The improved pressure relief valve as defined in claim 1 wherein the flow opening lies in a plane and the frame has a first wall which extends transversely of the flow opening of the plane, and further wherein the connecting aperture extends through the first wall.

8. The improved pressure relief valve as defined in claim 7 wherein there are a plurality of connecting apertures and a plurality of tab elements associated with the valve element.

9. A flap type pressure relief valve comprising:
a frame defining an air flow passage with the passage having a flow outlet with a first wall along a peripheral edge thereof;
a valve defined by a sheet of flexible elastomeric material overlying the flow outlet, with a first edge of the sheet lying adjacent the first wall; and,
connecting means joining the sheet to the frame, said connecting means comprising at least one resilient tab joined to the sheet along the first edge of the sheet and extending therefrom through a connecting aperture in the first wall, the tab having first and second enlarged portions on opposite sides of the first wall and a connecting portion joining the first and second enlarged portions, the connecting portion being disposed within in the connecting aperture and radially compressed by the frame.

10. The flap type pressure relief valve as defined in claim 9 wherein the connecting portion of the tab is under axial tension between the first and second enlarged portions.

11. The flap type pressure relief valve as defined in claim 9 wherein the tab and the sheet are extrusion molded from the same elastomeric material.

12. The flap type pressure relief valve as defined in claim 9 wherein the tab is integral with the sheet and joins to the sheet through a thin flexible hinge section for permitting free swinging of the sheet relative to the tab.

13. A method of forming a flap type pressure relief valve comprising:
a) providing a relatively rigid frame defining a flow passage with flow outlet opening with a first wall extending along a first side of the opening;
b) providing a connecting aperture through the first wall at a location adjacent the outlet flow opening;
c) providing a valve element in the form of relatively thin sheet of material of a size sufficient to completely overlie the outlet opening, the sheet having a tab extending from an edge thereof with the tab being formed from a resilient elastomeric material and including a base joined to the sheet and a tab body terminating in an outer free end, the tab body including an intermediate portion between the base and the free end that in its relaxed state is larger in cross-section than the connecting aperture but which can be compressed to a cross-section less than the connecting aperture;
d) positioning the sheet over the outlet opening with the tab aligned with the connecting aperture; and,
e) pulling the free end of the tab through the aperture to seat the intermediate portion within the aperture.

14. The method as defined in claim 13 including the step of removing the free end portion of the tab after the intermediate portion enters the connecting aperture.

15. The method as defined in claim 13 including the step of forming the sheet and the tab as a single unitary structure.

16. The method as defined in claim 15 including the step of forming the sheet and the tab from the same material by extrusion molding.

* * * * *